Patented Nov. 12, 1940

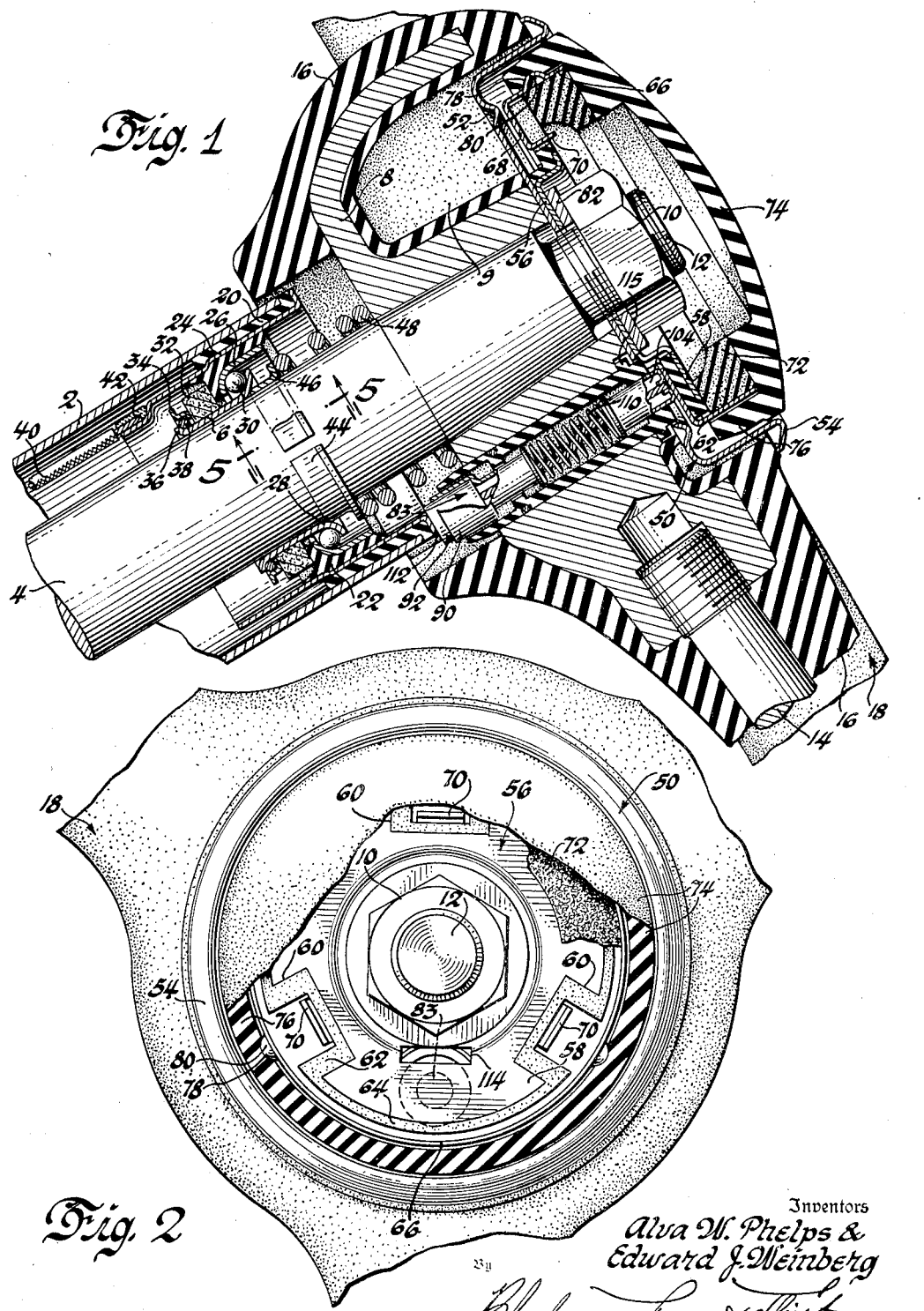

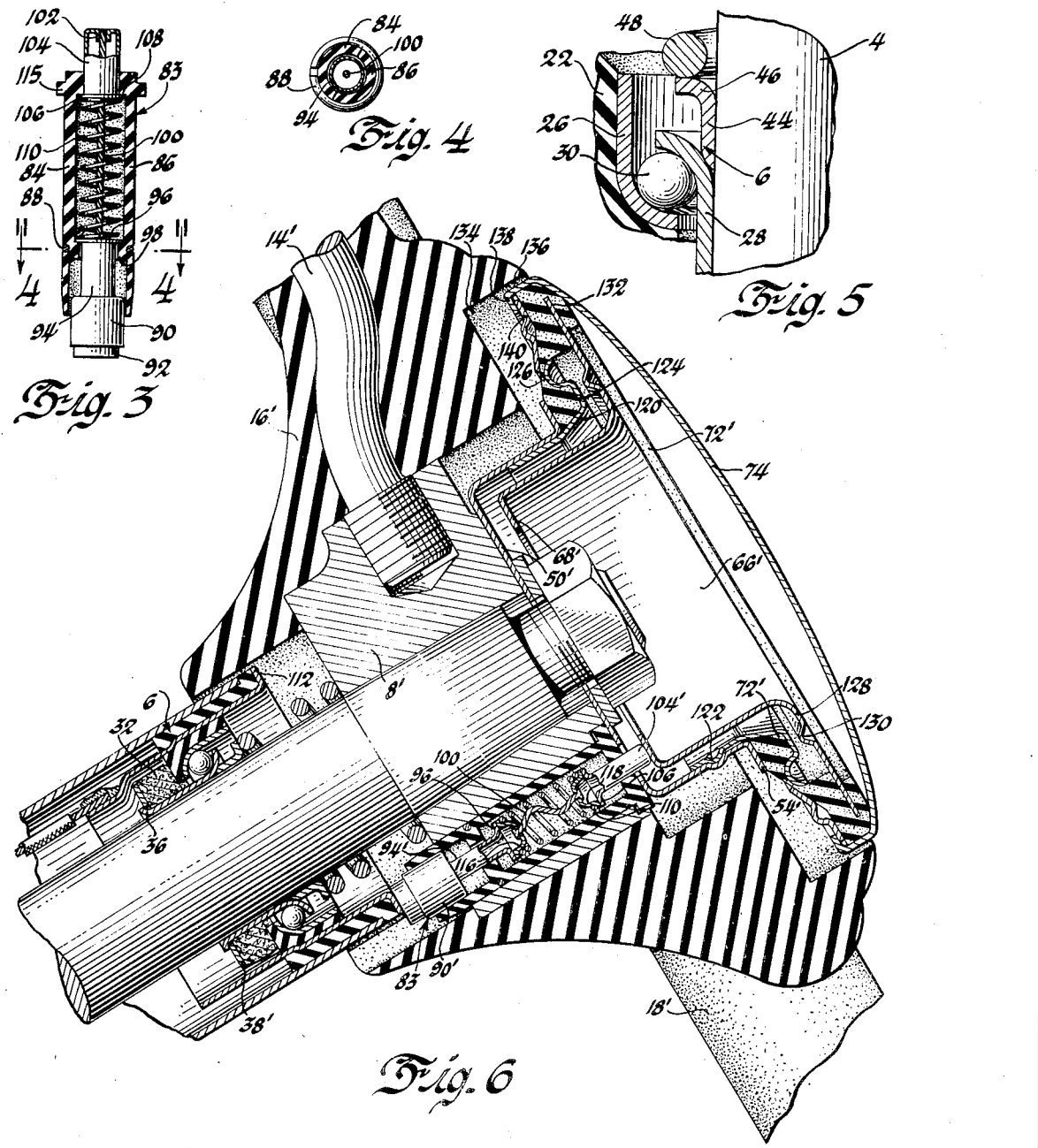

2,221,409

UNITED STATES PATENT OFFICE 2,221,409

HORN BUTTON ASSEMBLY

Alva W. Phelps and Edward J. Weinberg, Saginaw, Mich., assignors to General Motors Corporation, Detroit, Mich., a corporation of Delaware Application July 12, 1939, Serial No. 283,936

6 Claims. (Cl. 200—59)

This invention relates to steering wheels and the particular novelty resides in the horn button assembly, the connector assembly, and the steering column bearing and the electrical contact associated therewith.

The novelty of the horn button assembly resides in the position of two contact cups, one of which is held spaced from the other by a soft rubber ring which is in contact with the horn button. A plate having a dished center forms a part of the assembly and this plate has a hard rubber insulation secured thereto properly to insulate it from the contact cups.

The connector assembly is mounted in a passage in the steering wheel hub and has two spaced end contacts held apart by a spring. One of the contacts presses constantly against one of the contact cups of the horn button assembly, while the other contact is movably held in engagement with another contact built as a part of a bearing for the steering shaft.

The steering shaft bearing has a split collar around the steering shaft and this collar is pressed against one race of the bearing by means of a coil spring held between the steering wheel hub and the split ring.

On the drawings

Figure 1 is a sectional view of the steering wheel in the position in which it is mounted in the ordinary automotive vehicle.

Figure 2 is a plan view of the structure of Figure 1 with parts broken away and shown in section better to illustrate the construction.

Figure 3 is a sectional detailed view of the connector assembly.

Figure 4 is a section on the line 4—4 of Figure 3.

Figure 5 is an enlarged detail view of the bearing shown in Figure 1.

Figure 6 is a sectional view similar to Figure 1 of a modification.

Referring to the drawings, the numeral 2 indicates the stationary column or mast of the steering post of an automotive vehicle. The usual steering shaft 4 is mounted therein in a bearing 6 and at the top of the shaft 4 a steering wheel hub 8 is seated and held in place by a nut 10 screwed on the threaded end 12 of the shaft 4. The hub 8 has the central recesses and the usual metal spokes 14 covered by a hardened plastic 16 to form a steering wheel indicated as a whole at 18. The hardened plastic 16 extends inside the recesses 9.

The bearing 6 comprises the outer cylinder 20 of insulating material and the inner cylinder 22 of insulating material.

Between these two cylinders there is received the metallic contact cylinder 24. If desired, the contact cylinder 24 may have a plurality of openings therein at the contact surfaces between the cylinders 20 and 22 so that the cylinders 20 and 22 may be molded in one piece with the contact cylinder 24.

The inner cylinder 22 is suitably shaped to receive the outer bearing race 26 while the inner bearing race 28 fits against the steering column 4. The balls 30 are received between the races 26 and 28 and are held by the curved flanged ends as shown in Figure 5.

Beneath the lower end of the insulating cylinder 22 and against the inner race 28 a packing 32 is applied. The packing is held in place by means of a ring 34 which is passed over the flared end 36 at the bottom of the inner race 28. A split ring 38 is positioned between the flared end 36 and the ring 34 and holds the ring and packing 32 in place.

The contact cylinder 24 has the wire 40 soldered thereto as indicated at 42.

Over the bearing 6 a split ring 44 is positioned around the shaft 4. The ring 44 has a flanged shoulder or a seat 46 and between the shoulder 46 and the bottom of the hub 8 a coil spring 48 is under compression and constantly urges the ring 46 into the curved or flared end of the inner race 28 constantly to urge the bearing against the balls 30.

The horn button assembly comprises the outer retainer contact cup 50 having pressed in its bottom the ring 52 and having the outer peripheral flange 54 which extends over the rubber part 16 of the steering wheel hub. This outer contact cup 50 has an opening in its center in order that it may be received over the end 12 of the steering shaft 4. Inside the outer cup 50 a plate 56 is mounted. This plate is dished at its center where it is received over the end 12 of the steering shaft and has the outwardly extending flange 58. This flange 58 is recessed at three parts 60 spaced 120° apart and the underside of the flange 58 has the hard rubber or paper insulation 62 secured thereto. This insulation extends outwardly for a short distance beyond the periphery of the flange 58 as shown at 64 in Figure 2.

A second contact cup 66 is positioned inside the outer contact cup 50. This contact cup has the inturned bottom flange 68 and at three places spaced 120° apart the flange 68 has the upturned flanges 70, the flanges 70 fitting into the recesses or spaces 60 formed in the flange 58 of the plate 56.

Over the flange 58 of the plate 56 and inside the inner contact cup 66 there is positioned the compressible soft rubber ring 72. The horn button 74 (of hard rubber or metal) has the downwardly extending peripheral flange 76 which fits over the outside of the inner contact cup 66 but inside the outer contact cup 50. The button is spaced from the outer contact cup and at suitable points around its inner periphery the flange 76 is provided with suitable indentations 78 in which there are received the protuberances or projections 80 formed in the side of the inner contact cup 66. The button 74 is forced in place by forcing the flange 76 over the contact cup 66. The rubber 72 will be compressed and enable the bottom of the contact cup 66 to strike against the upturned rim 52 in the outer contact cup and the applied pressure will force the flange 76 of the button 74 over the protuberances 80 and finally cause the protuberances 80 to fall into the recess 78.

A washer 82 is positioned between the nut 10 and the plate 56.

The connector assembly 83 is shown in detail in Figure 3 and comprises the outer semi-cylindrical insulator halves 84 and 86. These halves are similar and are adapted to be positioned together as is best shown in Figure 4 to form a cylinder in which the connectors are positioned. The two halves 84 and 86 are held together by a split wire ring 88.

Inside the insulators 84 and 86 the electric connections are mounted. The lower contact comprises the cup-shaped element 90 in which there is positioned the copper graphite member 92. The cup 90 has the circular neck 94 extending upwardly therefrom and the flange 96 on the end of the neck fits over the shoulders 98 formed on the inside of the insulators 84 and 86. A stranded copper wire 100 is secured in any suitable way to the copper graphite contact 92. This wire extends upwardly and is connected as shown at 102 in Figure 1 to the bottom of an upper contact cup 104. This contact cup 104 has the flanged end 106 which strikes against the interior shoulders 108 on the end of the insulators 84 and 86. A coil spring 110 is under compression between the flanges 96 and 106 and always presses the contacts 90 and 104 apart.

Referring to Figure 1, the upper contact 104 is always pressed against the inner contact cup 66 while the lower contact 92 is always in contact with the outwardly turned flange 112 formed at the upper end of the contact cylinder 24. The spring 110 always maintains the two end contacts 92 and 104 in engagement with the flange 112 and the inner contact cup 66, respectively.

In order to sound the horn the operator presses the button 74. This will compress the soft rubber ring 72 and cause the bottom of the inner contact cup 66 to strike against the ring 52 on the outer contact cup 50 to complete the electrical circuit. The current then passes through the connector assembly 83, illustrated in detail in Figure 3, through the contact cylinder 24, and the wire 48 to sound the horn.

The plate 56 is provided with an opening 114 where the contact cup is received over the heads 115 of the insulators 84 and 86. This opening is to allow the insulator heads to project upwardly above the bottom of the outer contact cup 50.

In the modification shown in Figure 6, the bearing 6 is essentially the same as that shown in Figure 1 except that at the lower end instead of the ring 34 and the wire retainer 38, a split flat ring 38' is used. This ring is yieldable at the split and when applied over the inturned flange 36 rigidly holds the packing 32 in place.

The hub 8' of the steering wheel has a somewhat different shape and the individual elements of the connector assembly 83 are slightly different in shape, but the function and operation is identical. The lower contact 90' has a smaller cylindrical neck 94' and the flange 96 has an inverted cup-shaped element 116 secured thereto. One end of the wire 100 is secured to this cup-shaped element and the other end is secured to a second cup-shaped element 118 which in turn is secured to the flange 106 on the upper contact 104'. The coil spring 110 is positioned between the cups 116 and 118.

The horn button assembly comprises the outer contact cup 50' which is provided with an outwardly flanged edge 54'. Inside the outer contact cup 50' a supplementary contact cylinder 120 is positioned and held in place by the indentations 122. The upper part of this secondary contact cylinder 120 is flanged as at 124, the flange terminating in the half round 126.

The inner contact cup is indicated at 66' and is provided with the inturned bottom flange 68' against which the upper contact 104' of the contact assembly 83 is constantly in contact. The outer part of the inner contact member is flanged as indicated at 128, this flange extending over the flanges 124 and 126 of the secondary contact cylinder 120. The flange 128 has a downwardly pressed ring part 130 immediately over the end flange 124 and when in contact with the flange 124 completes the electric circuit to sound the horn.

A suitably shaped soft rubber element 72' has a recess 132 at its inner periphery and in this recess the edge of the flange 128 is received. The rubber ring 72' extends under the flanges 124 and 126 and rests on top of the flange 54' of the outer contact member.

The horn button 74' closes the usual recess 134 in the steering wheel and fits over the contact member and the rubber element 72'. The horn button has the downwardly turned peripheral flange 136 and the inturned flange 138. The flange 138 retains a split ring 140 positioned under the soft rubber element 72'. By depressing the horn button 74' the rubber element 72' will be compressed to enable the ring 130 on the inner contact member 66' to be pressed in contact with the flange 124 on the secondary contact cylinder 120 to complete the circuit through the horn and sound the horn.

The steering wheel hub 8' is surrounded by the usual hard rubber molded and shaped part 16' and the usual steering wheel spokes 14' are connected to the hub 8' and form the steering wheel 18'.

We claim:

1. In combination with a steering wheel having a hollow hub, a horn button assembly mounted in the hollow hub, said assembly including a cup-shaped contact, a dished plate positioned inside the contact, the edge of said plate being spaced from the contact, a layer of hard rubber secured to the underside of the plate, a contact element surrounding the plate and having an inturned edge flange extending under the plate, said contact member being normally held spaced from said cup-shaped contact, a button secured to the contact element, soft compressible rubber between the button and the plate, the depression of said button causing the contact element to come into contact with the cup-shaped contact to complete an electric circuit to sound the horn.

2. In combination with a steering wheel having a hollow hub, a horn button assembly mounted in the hollow hub, said assembly including a cup-shaped contact, a ring-shaped projection formed in the bottom of the contact, a dished plate positioned inside the contact, the edge of said plate being spaced from the contact, a layer of hard rubber secured to the underside of the plate, a contact element surrounding the plate and having an inturned edge flange extending under the plate, said contact member being normally held spaced from said cup-shaped contact, a button secured to the contact element, soft compressible rubber between the button and the plate, the depression of said button causing the contact element to come into contact with the projection on the cup-shaped contact to complete an electric circuit to sound the horn.

3. In combination with a steering wheel having a hollow hub, a horn button assembly mounted in the hollow hub, said assembly including a cup-shaped contact, a dished plate positioned inside the contact, the edge of said plate being spaced from the contact, a layer of hard rubber secured to the underside of the plate, mating recesses in the edge of the plate and in the rubber, a contact element surrounding the plate and having an inturned flange extending under the plate, said contact member being normally held spaced from said cup-shaped contact, fingers on the contact member extending into the said recesses to prevent movement of the contact member relative to the plate and hard rubber layer, a button secured to the contact member, soft compressible rubber between the button and the plate, the depression of said button causing the contact member to come into contact with the cup-shaped contact to complete an electric circuit to sound the horn.

4. In a horn sounding element applied to the steering wheel of an automotive vehicle, a steering mast, a steering shaft mounted in the mast and to which the steering wheel is operatively connected, a bearing mounted between the mast and shaft, an electric contact forming a part of the bearing and mounted in the bearing, two spaced contacts mounted on the steering wheel, means to enable one contact to be pressed into electrical engagement with the other, and an electric connection between one of the contact members and the electric contact associated with the bearing, said electric connection comprising two spaced contact elements, a spring element under compression between said elements, and a wire interconnecting the two spaced contact elements.

5. In a horn sounding arrangement applied to the steering column of an automotive vehicle, said steering column comprising a steering mast with a steering shaft mounted in a bearing therein, and a steering wheel mounted on the shaft, an electric contact formed as a part of the bearing, said steering wheel having a hub, a passage in the hub, a contact element in the passage comprising a cylinder of insulating material, two contacts, one contact at each end of the cylinder, a wire interconnecting the contacts, and a spring under compression between the contacts, and a depressible button mounted on the steering wheel and adapted when depressed to complete the electric circuit through all of the contacts to sound the horn.

6. In a horn sounding arrangement applied to the steering column of an automotive vehicle, said steering column comprising a steering mast with a steering shaft mounted in a bearing therein and a steering wheel mounted on the shaft, an electric contact formed as a part of the bearing, said steering wheel having a hub, a passage in the hub, a contact element in the passage comprising a cylinder of insulating material, two contacts, one contact at each end of the cylinder, a wire interconnecting the contacts, and a spring under compression between the contacts, two spaced contact cups on the steering wheel, one of said contact cups constantly in engagement with the contact element in the passage, the other of said contact cups movable into engagement with the first to complete the electric circuit through all the contacts to cause he horn to be sounded, and a depressible button mounted on the steering wheel and adapted when depressed to complete the electric circuit through all of the contacts to sound the horn.

ALVA W. PHELPS.
EDWARD J. WEINBERG.